United States Patent [19]

Rivers, Jr. et al.

[11] Patent Number: 5,299,829
[45] Date of Patent: Apr. 5, 1994

[54] PNEUMATIC SYSTEM FOR THE AUTOMATIC OPERATION OF SEMI-TRAILER LANDING GEAR

[76] Inventors: Bernard A. Rivers, Jr.; Darrell D. Amidon, both of 20891 Sailmaker Cir., Huntington Beach, Calif. 92648; Bernard A. Rivers, III, 8741 B. Hoffman St., Buena Park, Calif. 90620; Donald P. Rivers, 79 Ocean Ave. Extension, York Beach, Me. 03910

[21] Appl. No.: 958,685

[22] Filed: Oct. 9, 1992

[51] Int. Cl.5 ............................................. B60S 9/10
[52] U.S. Cl. .................................. 280/766.1; 280/475; 254/419
[58] Field of Search ............... 280/763.1, 764.1, 765.1, 280/766.1, 475, 427, 428; 254/419

[56] References Cited

U.S. PATENT DOCUMENTS

| 3,341,179 | 9/1967 | Smith | 254/419 |
| 3,503,588 | 3/1970 | Bach | 254/419 |
| 3,874,696 | 4/1975 | Gardner et al. | 280/475 X |
| 4,097,840 | 6/1978 | Chappelle | 280/431 X |
| 4,116,315 | 9/1978 | Vandenberg | 280/766.1 X |
| 4,281,852 | 8/1981 | Konkle | 280/766.1 |
| 4,345,779 | 8/1982 | Busby | 280/766.1 |
| 4,400,986 | 8/1983 | Swanson et al. | 280/766.1 X |
| 4,402,526 | 9/1983 | Huetsch | 280/766.1 |
| 4,466,637 | 8/1984 | Nelson | 280/766.1 |
| 5,004,267 | 4/1991 | Busby | 280/766.1 |

FOREIGN PATENT DOCUMENTS

| 706288 | 3/1965 | Canada | 280/766.1 |
| 0177482 | 4/1986 | European Pat. Off. | 280/475 |
| 0209042 | 4/1984 | Fed. Rep. of Germany | 280/475 |

Primary Examiner—Brian L. Johnson
Attorney, Agent, or Firm—William Nitkin

[57] ABSTRACT

A pneumatic system for automatically extending or retracting a semi-trailer's landing gear to support, raise or lower the trailer, such system utilizing a pneumatic gear motor attached to the gear reduction box assembly's inboard shaft through a coupling, allowing axial movement of the inboard shaft, such pneumatic gear motor interconnected to dual air lines selectively activated by a landing gear control valve receiving air from a valve disposed on the semi-trailer's air brake line.

2 Claims, 2 Drawing Sheets

FIG. IA

PNEUMATIC SYSTEM FOR THE AUTOMATIC OPERATION OF SEMI-TRAILER LANDING GEAR

BACKGROUND OF THE INVENTION

1. Field of the Invention

The system of this invention resides in the area of semi-trailer landing gear extension and retraction mechanisms and more particularly relates to an electrically activated pneumatic system for the raising and lowering of a semi-trailer's landing gear for positioning and/or raising and lowering the trailer.

2. Description of the Prior Art

Many semi-trailers have front landing gear for support of the front of the trailer when the tractor is detached. Such landing gears generally have two spaced-apart, jack-type structures joined by a cross-driven shaft engaged into a gear reduction box assembly. The gear reduction box assembly is driven by a manually operated crank. The gear reduction box assembly can have two gearing ratios: a low gear and a high gear. The gear ratio utilized within the gear reduction box assembly depends upon the lateral positioning of the crank shaft. Manually operated jack structures are often difficult to use, require much time for their operation and expose the operator to potential injuries as he is positioned next to the trailer while turning the crank to raise or lower the landing gear to in turn raise or lower the trailer.

The prior art includes many devices for the motorized extension and retraction of landing gear apparatuses for semi-trailers. Many of these prior art systems require their installation on the semi-trailer at the time of its construction or at the time of the installation of the landing gear thereon. Typical of such prior art in U.S. Pat. No. 4,466,637 to Nelson which discloses an electric motor to drive the usually manually operated crank system for raising and lowering of the semi-trailer landing gear. The prior art also teaches that when using electric motors, such motors can be controlled from within the cab of the vehicle such as taught in U.S. Pat. No. 4,097,840 to Chappelle. Pneumatically powered actuators for raising and lowering the semi-trailer's landing gear are disclosed in U.S. Pat. Nos. 4,400,986 and 4,402,526 both owned by the Atwood Vacuum Machine Company. These patents disclose a complex structure to receive pressurized air for the actuators to rotate the crank shaft of the gear reduction assembly to raise and lower the landing gear. U.S. Pat. No. 4,345,779 to Busby discloses a pneumatically operated drive unit attached to the shaft of the gear reduction box assembly which drive unit is disposed to the outboard side of the gear box and utilizes a pneumatic impact motor which is attached to a nut member welded to the end of the gear reduction box assembly drive shaft. These types of units, though, provide a pulsating drive that is not conductive to the desired smooth operation of raising and lowering the landing gear legs. U.S. Pat. No. 3,874,696 to Gardner teaches that a landing gear can be pivoted rearward or forward by an air cylinder receiving air from the air brake line or the emergency air brake line of the trailer. The landing gear of Gardner is not directly adjustable up and down by a gear system and cannot raise or lower the trailer. Other means for the raising and lowering of landing gear are known in the prior art such as the use of hydraulic pistons as disclosed in U.S. Pat. No. 3,503,588 to Bach. The hydraulic system of Bach is large and cumbersome, and hydraulic pistons do not provide the same positive holding as provided by a gearing arrangement. Power failure or loss of pressure could cause failure and collapse of the landing gear.

Because of the complexity and expense of prior art systems for raising and lowering semi-trailer landing gear, they have not been widely accepted in the trucking industry. Also because of the prior art's complexity and need for specialized parts, many of which have proven to be fragile, they have been generally unsuitable to the rugged demands of over-the-road semi-trailers in use of a daily basis.

SUMMARY OF THE INVENTION

It is an object of this invention to provide an improved landing gear raising and lowering system using a vane-type pneumatic motor utilizing air from the vehicle's existing air pressure lines that extend to the brakes of the trailer which system operates in a simpler, smoother and far less complicated fashion to raise and lower the landing gear of a semi-trailer than prior art devices.

In the device of this invention a pneumatic gear motor is mounted inboard of the gear reduction box assembly of the landing gear by means of a coupling. The source of motive power, as will be described in further detail below, is obtained by tapping into the existing air brake line on the trailer unit to utilize the air pressure therein. In one embodiment, the use of a coupling, in which the gear reduction box assembly's inboard shaft can be moved on the output shaft of the motor, allows for the rigid mounting of the motor to the gear reduction box assembly while allowing the changing from high gear, to neutral, and to low gear in a simplified fashion. Built-in spring tension in the coupling maintains the unit in high gear until a change of gear is desired. Low gear can be obtained by manual shifting as will be described further below. The system of this invention utilizes a double solenoid air control valve to direct the air pressure from the brake line to a reversible pneumatic gear reduction motor through a selection of dual air lines to cause either forward or reverse rotation of the gears in the gear reduction box assembly as desired to raise or lower the landing gear legs. The system is controlled by an electric control unit or a hand-held remote control unit. The air valve on the brake line within the system, when activated by the control unit, also serves as a safety mechanism to prevent the inadvertent raising or lowering of the landing gear. The system of this invention can be installed on existing landing gear reduction box assemblies. The device of this invention is also operable even when submersed in water.

A key feature of this invention is the vane-type pneumatic gear motor which has a large, built-in gear reduction ratio in the range of 80–100 to 1 and creates high torque on the landing gear's gear reduction box drive shaft even when being operated by a small volume of air. The coupling of the motor to the gear reduction box assembly allows axial movement of the gear reduction box assembly inboard shaft as much as 1 inch.

Therefore it is a further object of this invention to provide a system for the automated and remotely controlled operation of the raising and lowering of a semi-trailer's landing gear.

It is therefore a still further object of this invention that the system of this invention be retrofitted onto existing trailer landing gear assemblies without impairing the operability of the prior art, manually operated systems already installed on the trailer. Thus, should the system of this invention fail for any reason, the manually operated former system can still be utilized to raise and lower the landing gear.

It is another object that the system of this invention can be installed on existing trailer landing gear systems without the need for rebuilding the entire landing gear system.

The system of this invention incorporates an indicator light to show whether the landing gear's raising and lowering system has been activated. The pneumatic gear motor utilized in this invention is connected to the inboard end of the crank shaft of the reduction gear box assembly which extends inwardly out of the reduction gear box assembly. A knob positioned on the outboard side of the crank shaft allows manual movement of the crank shaft inward to change gears which change is desired at times to lift extra heavy loads within the trailer. The system's ability to shift gears facilitates raising and lowering the legs of a trailer with a heavy load. The knob can be affixed to the crank shaft with a quick-release pin to allow changing of the knob back to a handcrank in the event that the user wishes to switch back to handcrank usage.

In one embodiment the system can use an activation switch to activate a remote control unit which can direct the raising or lowering of the trailer for a distance of up to 50 feet from the trailer without any mechanical interconnection. In another embodiment a control switch on the trailer activated by the activation switch in the cab allows the driver to stand between the cab and the trailer, and these embodiments reduce the likelihood of the user slipping or falling on ice or the possibility of the driver being hit by another vehicle which accident would be possible if the driver were handcranking the landing gear while standing at the side of the trailer in a high traffic area. Also the use of this device reduces physical injuries due to exertion caused by handcranking. The use of this device also reduces parking space requirements since no space need be left for a user to handcrank the landing gear. Trailers can be parked closer to one another as there is no need for a person to stand by the side of the trailer to gain access to an exterior manual crank. The system of this invention, including its pneumatic gear motor, is water-proof and very rugged, will operate in a very wide range of temperatures and is unaffected by freezing conditions. The use of a geared pneumatic vane motor also eliminates vibrations during operation and provides a smooth, pulsation-free power which can withstand rapid reversal and stalling without damage and can be operated in any position. Further there is no shock or explosion hazard when using the system of this invention as is found in many of the prior art systems. Also there is only a small number of components in the system of this invention in contrast to the rather complicated mechanical pneumatic actuators of the prior art. Moreover, the system of this invention is fully adapted for almost all existing landing gear systems, is lightweight and compact, and can be installed at a low cost. As an additional safety feature the system of this invention can lock the trailer brakes to prevent unwanted movement of the trailer.

BRIEF DESCRIPTION OF THE DRAWINGS

FIG. 1a illustrates a bottom plan view of the elements of the system of this invention without a depiction of the tractor or trailer.

DESCRIPTION OF THE PREFERRED EMBODIMENT(S)

Figure 1:
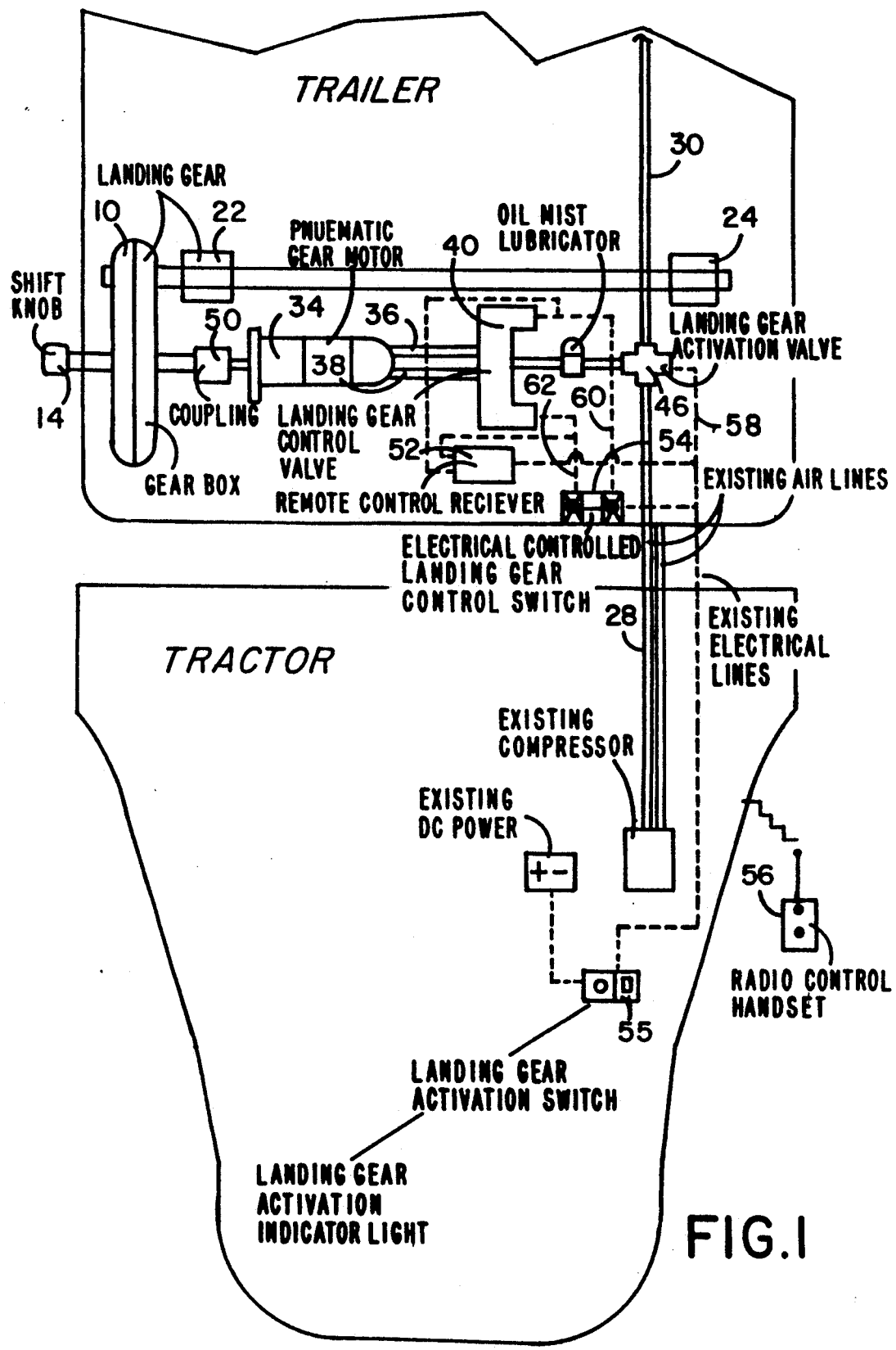
FIG. 1 illustrates a diagrammatic bottom plan view of the system of this invention.

FIG. 1 illustrates a diagrammatic bottom plan view of the system of his invention which can be installed on the bottom of a semi-trailer adjacent to the semi-trailer's landing gear system. The tractor and trailer are shown in this view. FIG. 1a illustrates the elements of the system of this invention and as the system of landing legs is well known to those skilled in the art, it is only partially illustrated. What is illustrated in FIG. 1a is gear reduction assembly 10 and drive shaft 20 which runs to landing legs 22 and 24 which move up and down, supporting, raising or lowering, the front of the trailer when separated from the tractor. An outboard crank shaft 12 in the prior art would extend to a manually operable handle which is not seen in this view as it is replaced in this invention by knob 14. The elements of this system can be installed on the bottom of the trailer or otherwise mounted on the trailer. Pneumatic gear motor 34 is mounted to mounting plate 70 which is held by long mounting bolts 72 and 74 to their respective interconnections 78 and 80 where the bolts 72 and 74 are attached into existing bolt apertures formed around the perimeter of the cover of the gear reduction box assembly. Other mounting bolts can be used to engage from plate 70 to the bolt apertures already formed in the cover around the gear reduction box assembly. In this way pneumatic gear motor 34 can be retrofitted onto existing gear reduction box assemblies by merely removing the bolts that were in the position holding the covers where the gear reduction box assembly bolts 72 and 74 are now attached. By using the elongated bolts extending to mounting plate 70 on which pneumatic gear motor 34 is mounted, a very convenient way of attaching the pneumatic gear motor securely to an existing gear reduction assembly is provided. Some trailer structure configurations require mounting on an intermediate structure. From the pneumatic gear motor extends a motor output shaft 48 which is attached by coupling 50 to inboard shaft 26 of the gear reduction box assembly. Inboard shaft 26 exists in the prior art and is an extension of outboard crank shaft 12. To change gears in the prior art when manually cranking a handle attached where knob 14 is seen in this view, one pushes the handle and attached outboard shaft inward or outward, which movement changes the gear reduction box assembly's gears from a high gear to a low gear. Pneumatic gear motor 34 is powered through two air lines: first air line 36 and second air line 38. Pneumatic gear motor 34, being a vane-type rotary motor driven by air and having its output pass through a gear reduction assembly of 80-100 to 1 gear reduction ratio within the motor, provides high torque to its output shaft 48. The control of the direction of rotation of pneumatic gear motor 34 is dependent upon which air line, 36 or 38, the air pressure is directed. If the air comes through first air line 36, the pneumatic gear motor 34 rotates in one direction and line 38 becomes the air exhaust line for motor 34. If air pressure is provided in second air line 38 which enters pneumatic gear motor 34, then the rotation of motor 34 will be in the opposite direction with air line 36 acting as the air exhaust line. This arrangement allows for inboard shaft 26 to be rotated in the desired direction to raise or lower landing legs 22 and 24 which raising and lowering by the gear reduction box assembly is well known in the prior art and therefore is not illustrated herein. In order to control which air line 36 or 38 receives the air, landing gear control valve 40 is provided which receives air through air line 44. The air in line 44 can pass through an automatic lubrication unit 42 which units are also known in the art. Brake line 28 of the vehicle carrying the air pressure that would run to the rear brakes of the vehicle has a landing gear activation valve 46 placed thereon with a continuation air line 30 of the brake line extending to the rear wheels. When the landing gear activation valve 46 is activated, it exhausts air line 30 to lock the trailer's brakes and at the same time redirects air pressure through line 44 to landing gear control valve 40. An alternate embodiment can leave out the landing gear activation valve and substitute a T-fitting on auxiliary brake line or a manually operated valve. Landing gear control valve 40 is electronically controlled to direct the air through either air line 36 or 38 depending upon the direction of rotation the user desires.

Activation switch 55 is located in the cab and directs power to landing gear activation valve 46 which when activated directs air to landing gear control valve 40. If activation switch 55 is not activated, then no air pressure is provided to landing gear control valve 40 and the system will not operate. This prevention of operation acts as a safety system so that no one can inadvertently or deliberately raise or lower the landing gear by the system of this invention unless the operator has activated the system by turning on activation switch 55 in the cab. In one embodiment control switch 54 can be located on the trailer and controls the landing gear control valve 40 through electrical lines 60 and 62. Lines 60 and 62 will activate or deactivate the dual solenoid valves in landing gear control valve 40 to either alternately open first air line 36 and at the same time exhaust second air line 38 or alternatively, to open second air line 38 and exhaust first air line 36 which changes control the direction of rotation of the pneumatic gear motor 34 by operation of control switch 54 located on the trailer which directs which one of the dual solenoid valves is to be opened in landing gear control valve 40. Activation switch 55 can be located on the dashboard of the tractor and be powered from power supply 32 of the vehicle such as its battery. Also the system of this invention can in one embodiment utilize a remote control unit 56 which would by radio waves activate radio control receiver unit 52 which is interconnected to electrical lines 62 and 60 by lines 64 and 66 respectively which by usage thereof will have the same effect to control which valve within landing gear control valve 40 will open to direct air into the selected of first air line 36 or second air line 38 extending to pneumatic gear motor 34. An alternate embodiment can merely use a manual switch on the landing gear control valve for a simpler system. The manually controlled valves would just open one line and exhaust the other and when switched, would open the other line and exhaust the first line as done on the electrically controlled solenoid switch embodiment.

Figure 2:
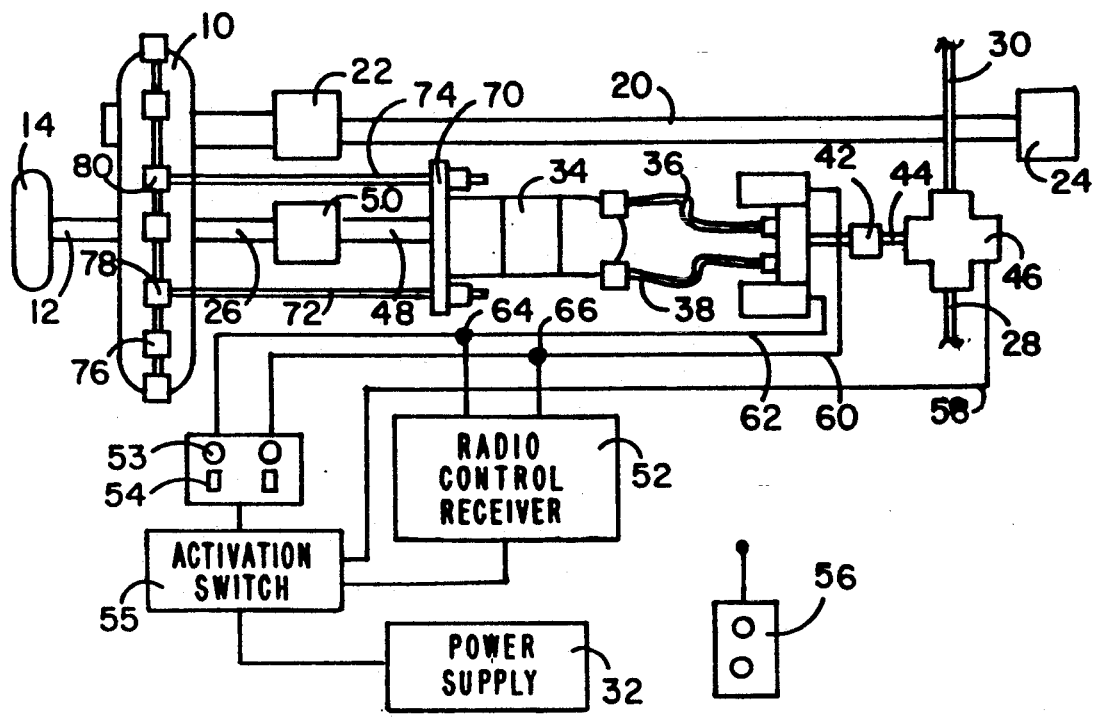
FIG. 2 illustrates a side cross-sectional view of the coupling of a pneumatic gear motor to the inboard portion of the gear reduction crank shaft.
Figure 2:
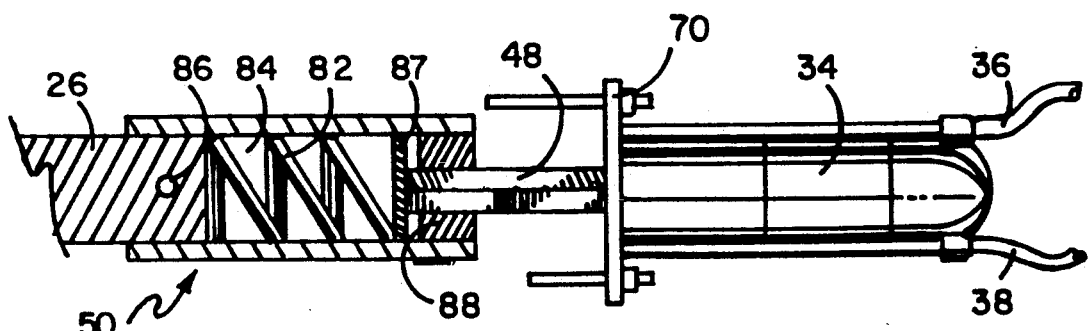

In use, pneumatic gear motor 34, being a rotary, vane-type motor having a gear system with an 80–100 to 1 gear reduction ratio located within the motor, would apply high torque in the range of 50–60 foot-pounds to its output shaft 48 which through coupling 50, would drive the inboard shaft 26 to move the gear reduction box assembly gears to either raise or lower landing legs 22 or 24. When low gear is desired, knob 14 is provided on the dual end of outboard shaft 12, and knob 14 can be manually pushed inward if one desired to change the gearing ratio inside the gear reduction box assembly 10 to low gear. In this way outboard shaft 12 would move inward and at the same time inboard shaft 26 would move inward with coupling 50. Coupling 50 is adaptable by its structure to allow for the changing of gears by the inward movement of inboard shaft 26 while still maintaining pneumatic gear motor 34 in a fixed position. An example of a type of coupling which will allow the inward movement of inboard shaft 26 is seen in FIG. 2 where pneumatic gear motor 34 is seen with its output shaft 48 extending therefrom. Output shaft 48 can be a square shaft as illustrated and can pass into coupling 50. Coupling 50 includes housing 84 extending around output shaft 48 by receipt member 88 which receipt member has an aperture and which receipt member is slideably positioned around output shaft 48. Inboard shaft 26 is affixed to the end of housing 84. As spring member 82 is disposed within housing 84 between inboard shaft 26, plate 87 is displaced by output shaft 48. Plate 87 cannot pass through the aperture in receipt member 88. When in high gear, inboard shaft 26 is in the position as shown, securely held to housing 84 by a bolt passing through aperture 86, which bolt is not seen in this cross-sectional view. When knob 14 is pushed inward to put the gear reduction box assembly 10 into low gear, inboard shaft 26 moves inward against the pressure of spring member 82 a distance sufficient to engage low gear. Coupling member 50 moves with output shaft 48 moving within the aperture in receipt member 88 which can have an engaging square aperture which slideably mates over output shaft 48 such that the coupling member slides laterally along output shaft 48 passing through the square aperture in receipt member 88 in coupling 50 which action compresses spring member 82 and allows the low gear to be engaged. When the user releases manual pressure on knob 14 and pulls it back or allows spring member 82 to push on plate 87 on the end of output shaft 48, such pressure from spring member 82 engages or maintains inboard shaft 26 so that the gear reduction box assembly is then in high gear.

Figure 3:
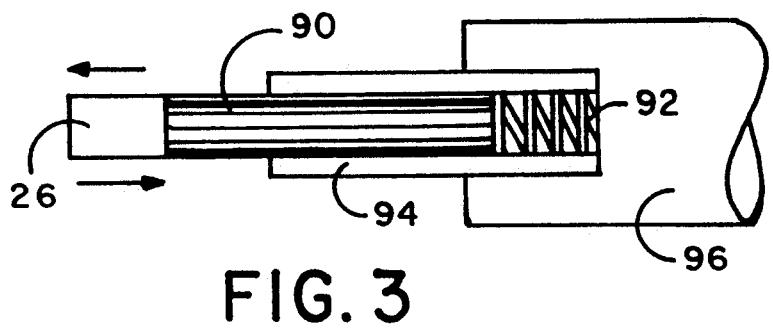
FIG. 3 illustrates a side cross-sectional view of the spline spindle coupling of a pneumatic gear motor to the inboard portion of the gear reduction assembly crank shaft.

An alternate embodiment of this invention uses a spline spindle shaft as seen in FIG. 3 wherein spline 90 is attached to inboard shaft 26 and can be moved in and out within spindle 94. Spring 92 can also urge against spline 90 and inboard shaft 26 to push outward to maintain the gear reduction box assembly in high gear until knob 14 is manually moved inward to engage low gear in which case spline 90 will move inward within spindle 94 but yet still be engaged so that it is rotated by spindle 94 as it has similar fluting which engages into the fluting on the spline so that as it is rotated, it yet still can be axially moved within the spindle.

Although the present invention has been described with reference to particular embodiments, it will be apparent to those skilled in the art that variations and modifications can be substituted therefor without departing from the principles and spirit of the invention.

We claim:

1. A device for the automatic raising and lowering of a tractor-trailer's landing gear on a trailer having a brake line, said landing gear having a gear reduction box assembly mounted to a shaft driving landing legs alternately upwards or downwards, such gear reduction box assembly having an outboard crank shaft for the rotation of the gears thereof and an inboard shaft extension of said crank shaft which outboard shaft in a manually maneuverable outward mode position engages a high gear and in a manually maneuverable inward mode position engages a low gear within said gear reduction box assembly for the raising and lowering of said landing legs of the trailer to support, raise or lower loaded or unloaded trailers, comprising:

a pneumatic gear vane-type motor providing smooth, non-pulsating rotary motion, said motor having an output shaft having an end, said motor having first and second air inlets, each allowing air to drive said pneumatic gear motor in opposite directions, said motor mounted on the inboard side of said gear reduction box assembly;

a coupling member coupling said output shaft of said pneumatic gear motor to said inboard shaft;

means within said coupling to allow for an axial sliding movement of said inboard shaft during a shifting between high gear and low gear of said gear reduction assembly;

said gear motor output shaft being square and having an end;

a receipt member with a square aperture defined therein, said gear motor output shaft being slideably engaged in said square aperture;

a housing having a first end and a second end, said second end having an aperture defined therein, said first end of said housing having said receipt member affixed thereto allowing said housing and receipt member to laterally slide on said gear motor output shaft, said aperture at said second end of said housing receiving said inboard shaft;

means to affix said inboard shaft to said housing;

a plate disposed within said housing at the end of said gear motor output shaft; and a spring member disposed in said housing between said inboard shaft and said plate to urge said inboard shaft outward to engage said outward mode position of gearing modes of said gear reduction box assembly such that when said manually maneuverable outboard shaft is manually maneuvered to said inward mode, said inboard shaft moves toward said motor, compressing said spring member and moving said housing and receipt member toward said motor while said gear motor output shaft slides laterally within said receipt member while still engaging said housing to rotate said inboard shaft to raise or lower said landing gear in a selected one of said high gear or low gear mode positions a knob member connected to said outboard shaft for a manual inward and outward axial movement as desired of the outboard shaft of said gear reduction box assembly;

a landing gear activation valve disposed on said brake line of said trailer adapted to direct air from said brake line;

a landing gear control valve adapted to receive air directed from said landing gear activation valve, said landing gear control valve having a first and second output alternately directable;

a first air line interconnected from the first output of said landing gear control valve to said first air inlet of said pneumatic gear motor;

a second air line attached from said second output of said landing gear control valve to said second air inlet on said pneumatic gear motor, said pneumatic gear motor drivable in a first direction by air coming from said first air line and in the opposite direction by air coming in said second air line;

means to control said landing gear control valve's selection of said first and second air output; and means to control said landing gear activation valve to direct air when desired from said brake line to said landing gear control valve.

2. The device of claim 1 wherein said pneumatic gear motor is a rotational pneumatic gear motor with a reduction gearing system built therein for the application of high torque from said gear motor's output shaft to the inboard shaft of said gear reduction box assembly.

* * * * *